US008475696B2

(12) United States Patent
Lin et al.

(10) Patent No.: US 8,475,696 B2
(45) Date of Patent: Jul. 2, 2013

(54) METHOD FOR PACKAGING LIGHT EMITTING DIODE

(75) Inventors: Chih-hsiang Lin, Taipei (TW); Ya-Lan Chuang, Tainan County (TW); Pei-Jung Tsat, Taichung County (TW); Shu-Ling Yeh, Taoyuan County (TW); Chin-Lang Wu, Miaoli County (TW); Cing-Jiuh Kang, Hsinchu (TW); Hsin-Ching Kao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1038 days.

(21) Appl. No.: 12/049,443

(22) Filed: Mar. 17, 2008

(65) Prior Publication Data

US 2009/0108496 A1 Apr. 30, 2009

(30) Foreign Application Priority Data

Oct. 29, 2007 (TW) .............................. 96140577 A

(51) Int. Cl.
*H01L 21/00* (2006.01)
(52) U.S. Cl.
USPC ............ 264/272.14; 264/272.15; 264/272.17; 264/328.1
(58) Field of Classification Search
USPC .......... 264/645, 513, 272.14, 272.15, 272.17, 264/328.1
See application file for complete search history.

(56) References Cited

U.S. PATENT DOCUMENTS

| 5,855,924 | A | * | 1/1999 | Lumbard | 425/116 |
|---|---|---|---|---|---|
| 6,537,470 | B1 | * | 3/2003 | Wood et al. | 264/29.5 |
| 6,755,640 | B2 | * | 6/2004 | Bauer et al. | 425/551 |
| 6,757,969 | B1 | * | 7/2004 | Chan | 29/841 |
| 7,358,599 | B2 | * | 4/2008 | Ohe et al. | 257/678 |
| 7,842,219 | B2 | * | 11/2010 | Jung et al. | 264/272.17 |
| 8,003,036 | B2 | * | 8/2011 | Jung et al. | 264/272.17 |
| 8,092,735 | B2 | * | 1/2012 | Thompson et al. | 264/272.17 |
| 8,303,878 | B2 | * | 11/2012 | Thompson et al. | 264/272.17 |
| 2002/0020940 | A1 | * | 2/2002 | Kiritani | 264/272.15 |
| 2003/0020192 | A1 | * | 1/2003 | Yabusaki et al. | 264/40.1 |
| 2005/0084992 | A1 | * | 4/2005 | Ricking et al. | 438/22 |
| 2006/0033235 | A1 | * | 2/2006 | Tomosada | 264/248 |
| 2007/0138696 | A1 | * | 6/2007 | Takase et al. | 264/272.17 |
| 2009/0127732 | A1 | * | 5/2009 | Tamura | 264/101 |

OTHER PUBLICATIONS

Taiwanese language office action dated Feb. 18, 2011.

\* cited by examiner

*Primary Examiner* — Christina Johnson
*Assistant Examiner* — Saeed Huda
(74) *Attorney, Agent, or Firm* — McClure, Qualey & Rodack, LLP

(57) ABSTRACT

A method for packaging a light emitting diode is provided. The steps comprise: providing a material; drying the material; feeding the material into a feeding inlet; and providing a mold with pre-embedded light diodes. The material enters the feeding inlet and is injected into the mold by pressing a screw, allowing the material to combine with the light emitting diode.

12 Claims, 3 Drawing Sheets

METHOD FOR PACKAGING LIGHT EMITTING DIODE

BACKGROUND OF THE INVENTION

1. Field of the Invention

The invention relates to a method for packaging a light emitting diode, and in particular, to a method utilizing the technique of injection molding.

2. Description of the Related Art

The conventional method for packaging a light emitting diode is accomplished by epoxy infusion, packaging epitaxy chips pre-embedded in a mold. Epoxy, thermosetting polymer, requires a curing process after entering the mold during the packaging process, resulting in decreased packaging rate. Additionally, when epoxy is cured, it is not recyclable and therefore waste material produced during the packaging process cannot be fully utilized. Moreover, after epoxy is cured, the products require aid of a mold release agent to be released from the mold. The products are formed with burr that an extra trimming procedure is necessitated. Further, epoxy has a transmission rate of merely 80% and it doesn't comprise desirable UV resistance. At last, epoxy contains corrosive chlorine which can damage the chips packaged therein.

BRIEF SUMMARY OF THE INVENTION

The invention provides a method for packaging a light emitting diode. The steps comprise: providing a material; drying the material; feeding the material into a feeding inlet; and providing a mold with pre-embedded light diodes. The material enters the feeding inlet and is injected into the mold by pressing a screw, allowing the material to combine with the light emitting diode.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
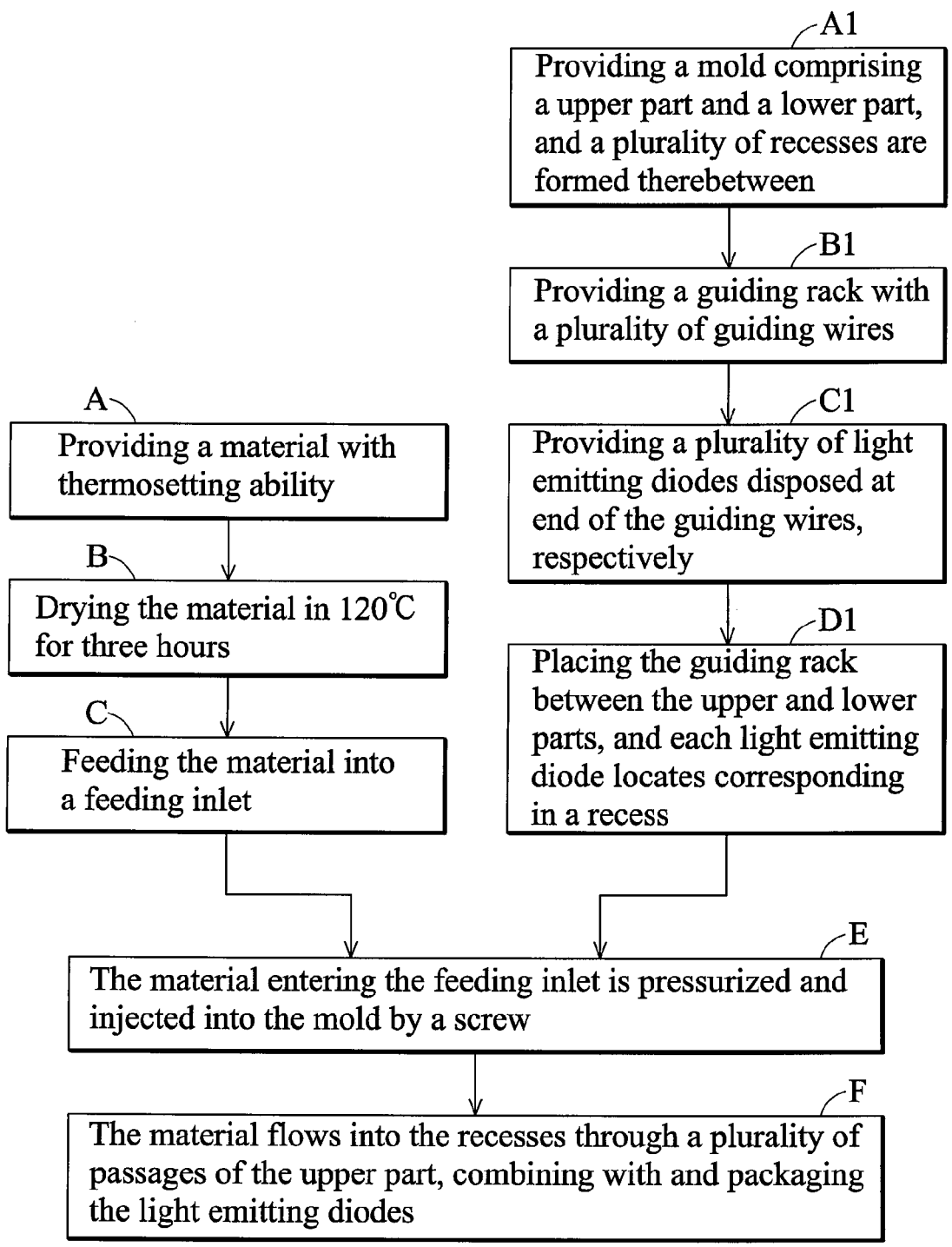
FIG. 1 is a flowchart showing the method for packaging a light emitting diode of the invention.
Figure 2:
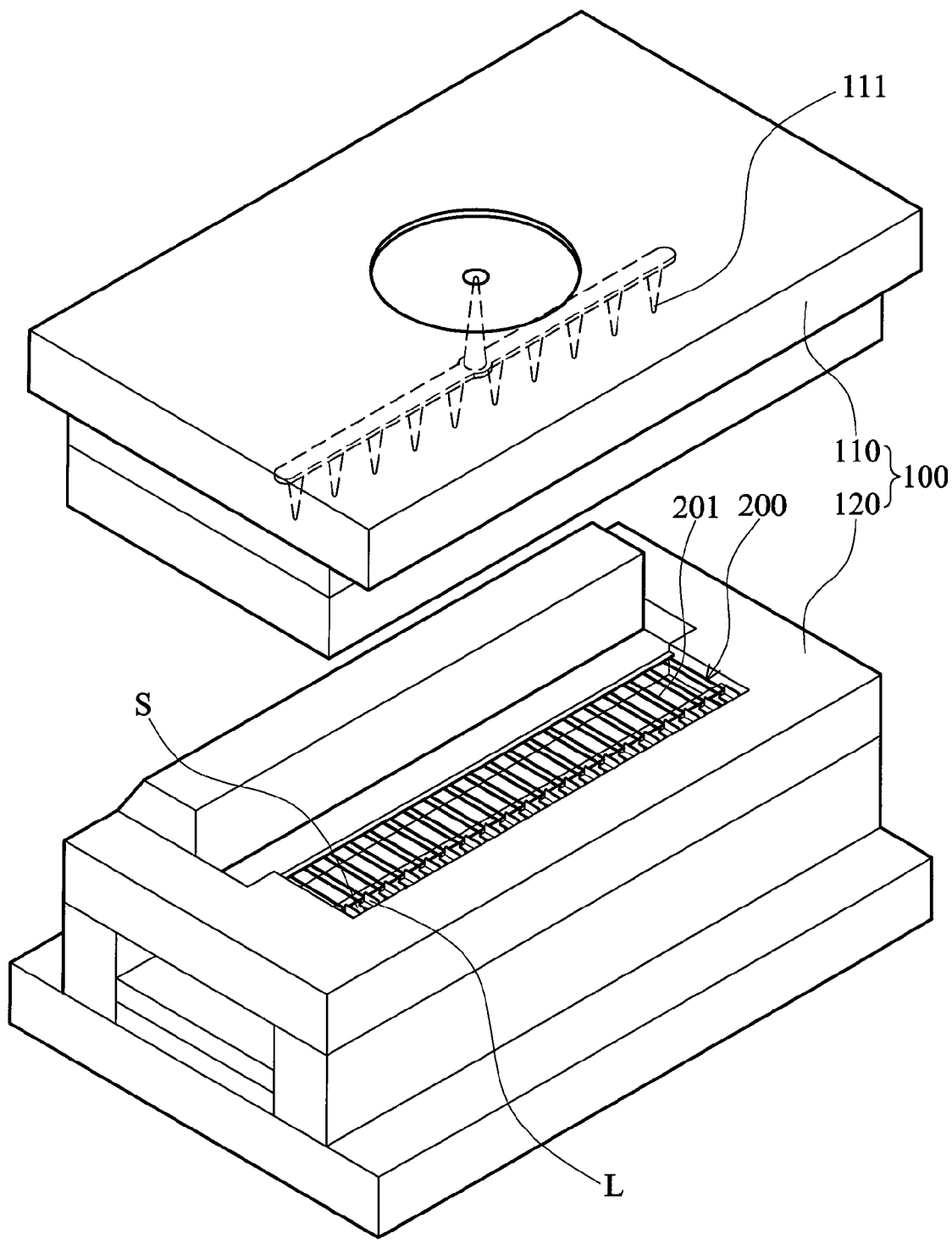
FIG. 2 is a schematic view of a mold of the invention.
Figure 3:
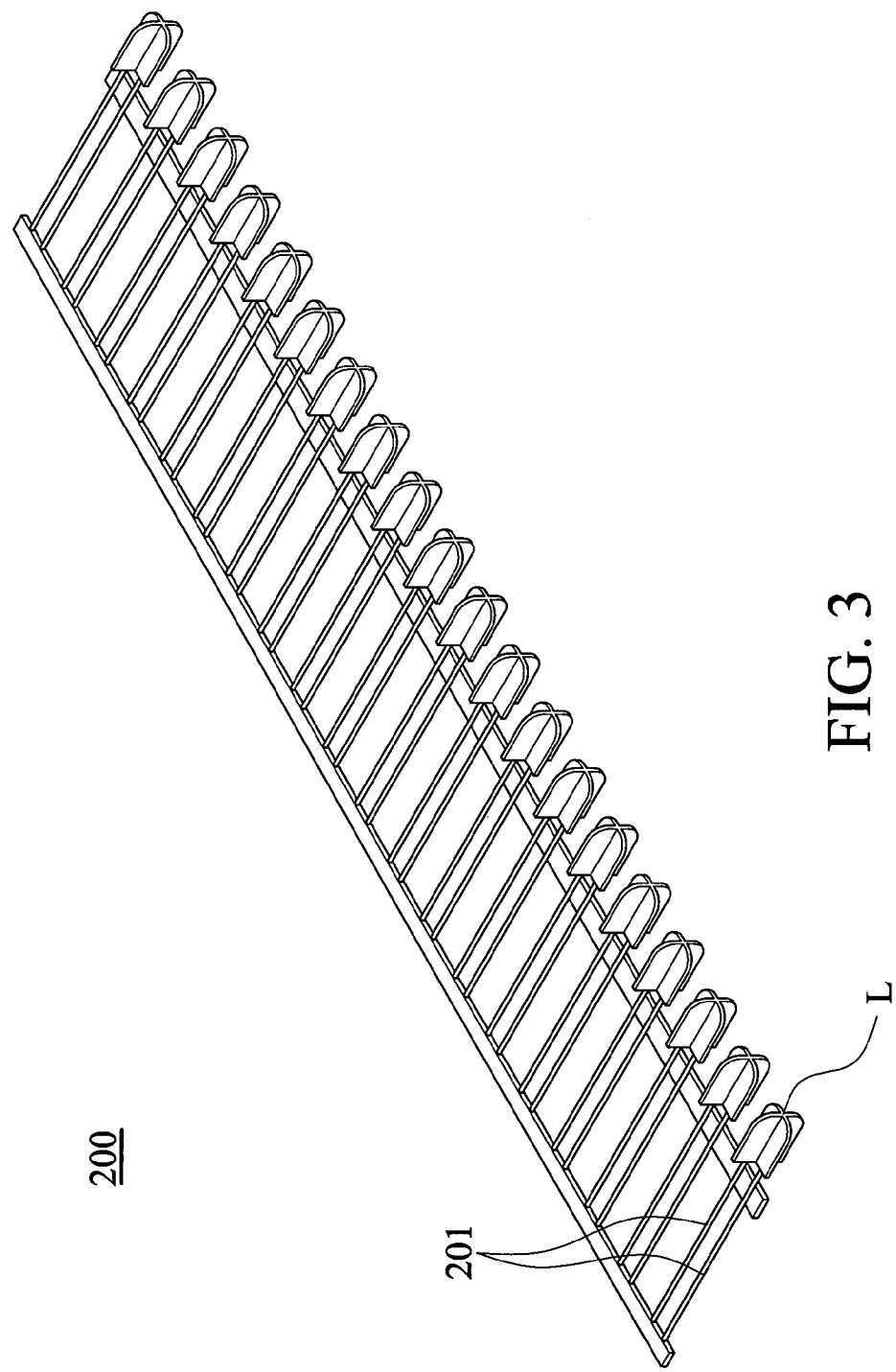
FIG. 3 is a schematic view of a guiding rack with light emitting diodes.

Referring to FIGS. 1-3, a method for packaging a light emitting diode of the invention is completed by injection molding, in which a material is pressurized in a mold, allowing the material to combine with a light emitting diode.

Referring to FIG. 1, firstly, a material is provided (as shown in step A). The material is a high polymer comprising the characteristics of thermoplastic, climate resistance, UV resistance and duration. The transparency of the material is greater than 80%, the heat resistance of the material is greater than 100° C., and absorptivity of the material is less than 0.5 wt %. For example, the material is polymer, acrylic, copolymer or combination thereof. Next step, the material is dried in 120° C. for three hours (as shown in step B), and fed into a feeding inlet (as shown in step C).

Referring to FIG. 2, a mold 100 is provided (as shown in step A1). The mold 100 comprises an upper part 110 and a lower part 120. The upper part 110 comprises ten passages 111. Twenty recesses S are formed between the upper part 110 and the lower part 120, wherein each passage 111 communicates with two recesses S.

Referring to FIG. 3, a guiding rack 200 is provided (as shown in step B1). The guiding rack 200 comprises a plurality of guiding wires 201, and twenty light emitting diodes L are disposed at ends of the guiding wires, respectively (as shown in step C1). The guiding rack 200 is disposed in the mold 100, and the twenty light emitting diodes L are correspondingly disposed in the recesses S (as shown in step D1).

Referring to FIG. 1 again, in step E, the material, entering the feeding inlet, is injected into the mold 100 by a screw with a diameter of 45 mm at a pressure of 100-200 Kg/cm². Temperature of the material is set to 265° C. at the feeding inlet, and 270° C. when it is injected into the mold. It should be noted that 265° C. is set to be the material temperature at the feeding inlet, and 275° C. is set to be the material temperature when the material is injected, but it is not limited thereto. According to the characteristics of different material, the material temperature at the feeding inlet can be set at 10° C.-30° C. above the melting point, and the material temperature during the injection can be set at 15° C.-35° C. above the melting point. At last, the material entering the mold 100, flows into the recesses S through the passages 111 of the upper part 110, allowing the material to combine with the light emitting diodes L, therefore packaging the light emitting diodes L therein (as shown in step F).

Table 1 shows the comparison between the method of the invention and the conventional method for packaging. The invention utilizes polyethylene terephthalate (PET) and the conventional method utilizes epoxy resin. Molecular formulas are as follow:

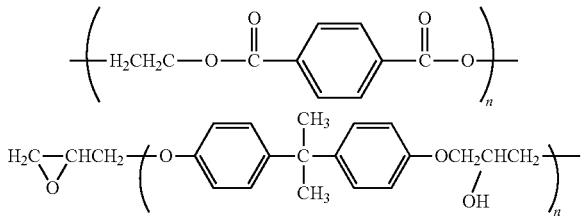

As shown in table 1, the PET injection molding of the invention for packaging the light emitting diodes comprises less injection time, curing time and packaging period. Additionally, post curing time and the cleaning of the mold can be eliminated, and a mold release agent is not required to help remove the products from the mold. The product is formed without burr, such that trimming process of the burr can be saved, saving costs and time. The use of thermoplastic material for LED packaging characterizes high transparency, high heat resistance, high refraction, high UV resistance and low absorptivity. It is also recyclable, saving material costs and protecting the environment at the same time.

TABLE 1

| | | Pet injection molding | Epoxy infusion |
|---|---|---|---|
| Material | Injection/infusion time | 1~5 sec. | 10~30 sec. |
| | Curing time | 3~10 sec. | 30~180 sec. |
| | Post curing time | 0 sec. | Few hours |
| | recycling | yes | No |
| | Mold release agent | Not required | Necessary |
| Formation | Cleaning mold | Not required | Necessary |

TABLE 1-continued

|  | Pet injection molding | Epoxy infusion |
|---|---|---|
| Packaging period | 15~30 sec. | 60~300 sec. |
| Burr production | No | yes |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for packaging light emitting diodes, comprising:
   providing a thermoplastic polymer material;
   drying the thermoplastic polymer material;
   providing a mold with pre-embedded light emitting diodes, the mold comprising:
   an upper part having a plurality of passages through which the high-polymer thermoplastic material is passed; and
   a lower part have two recesses for each of the plurality of passages, the recesses being in fluid communication with the plurality of passages, such that each of the plurality of passages is in fluid communication with two recesses; and
   feeding the thermoplastic polymer material into a feeding inlet of the upper part, the feeding inlet being in fluid communication with the plurality of passages;
   wherein the thermoplastic polymer material enters the feeding inlet and is injected into the mold by pressing a screw, allowing the material to combine with the pre-embedded light emitting diodes.

2. The method as claimed in claim 1, further comprising providing a guiding rack disposed in the mold, wherein the guiding rack has a plurality of guiding wires and is provided between the upper part and lower part.

3. The method as claimed in claim 2, wherein each of the plurality of light emitting diodes is disposed on an end of each of the plurality of guiding wires, respectively.

4. The method as claimed in claim 3, wherein the light emitting diodes are disposed in the recesses, in one-to-one correspondence.

5. The method as claimed in claim 4, wherein the material enters the recesses through the passages, packaging the light emitting diodes.

6. The method as claimed in claim 1, wherein the thermoplastic polymer material enters the recesses through the passages, packaging the light emitting diodes.

7. The method as claimed in claim 1, wherein during the step of drying the material, the drying temperature is 120° C.

8. The method as claimed in claim 1, wherein the material has a temperature of 10° C. to 30° C. above the melting point at the feeding inlet.

9. The method as claimed in claim 1, wherein the material has a temperature of 15° C. to 35° C. above the melting when it is injected into the mold.

10. The method as claimed in claim 1, wherein the screw is set to have an injection pressure of 100-200 Kg/cm$^2$.

11. The method as claimed in claim 1, wherein the screw has a diameter of 45 mm.

12. A method for packaging light emitting diodes, comprising:
    providing a thermoplastic polymer material;
    drying the thermoplastic polymer material;
    feeding the thermoplastic polymer material into a feeding inlet provided in an upper part of a mold;
    flowing the thermoplastic polymer material through a plurality of passages located in the upper part and into a plurality of recesses located in a lower part of the mold, wherein the high-polymer material is flowed around a plurality of pre-embedded light emitting diodes that are providing a mold with pre-embedded light emitting diodes that are located in the recesses.

* * * * *